Dec. 28, 1954 Y. P. M. MARTIN 2,698,219
ELIMINATION OF FOAM IN FOAMING CHEMICAL
REACTIONS AND APPARATUS THEREFOR
Filed April 16, 1949 2 Sheets-Sheet 1

INVENTOR.
Yves Pierre Michel Martin
BY

Dale A. Bauer
ATTORNEY

Dec. 28, 1954  Y. P. M. MARTIN  2,698,219
ELIMINATION OF FOAM IN FOAMING CHEMICAL
REACTIONS AND APPARATUS THEREFOR
Filed April 16, 1949  2 Sheets-Sheet 2

INVENTOR.
Yves Pierre Michel Martin
BY
Dale A. Bauer
ATTORNEY

United States Patent Office 2,698,219
Patented Dec. 28, 1954

2,698,219

ELIMINATION OF FOAM IN FOAMING CHEMICAL REACTIONS AND APPARATUS THEREFOR

Yves Pierre Michel Martin, Grand-Quevilly (Seine-Inferieure), France, assignor to Société Anonyme des Manufactures des Glaces et Produits Chimiques de Saint-Gobain, Chauny & Cirey, Paris, France Application April 16, 1949, Serial No. 87,898

9 Claims. (Cl. 23—1)

This invention relates to the reaction of raw material, the reaction of which is foam or froth producing. There are many industrial chemical reactions that normally release vast quantities of froth or foam. Many chemical reactions between solids and liquids release three to five times the volume of the reactants in foam, and sometimes even more. This reduces the capacity of apparatus to a fraction of that for which it was designed. In industry where the volume of reactants employed is large the problems raised by foaming become acute and in order to meet them a number of expedients have been adopted, such as larger apparatus, the use of sprays and other devices which are costly and only partially effective. It frequently happens that the inability to destroy the froth totally and rapidly compels one to abandon continuous processes and to operate apparatus of great size in successive and lengthy operations.

It is an object of the present invention to overcome the inconveniences inherent in the formation of large quantities of foam and to rapidly destroy all froth, and to do so in continuous processes. The process comprises introducing all or a part of the raw materials of the reaction into the lower part of a reaction vat through a compartment communicating with the lower part of the vat, the said raw materials being impelled into the lower part of the vat with such speed that it is practically impossible for them to react before having penetrated into the vat, the reaction taking place in the lower levels of the vat under relatively high liquid head which is furnished by the reaction mass in the vat, the reaction products being removed from the vat.

This process completely changes the character of reactions which liberate foam abundantly such as in the attack on carbonates, or in the attack on phosphates by acid liquors, experience showing that the bubbles of gas which are liberated by the reaction in the lower regions of the reaction mass where the head is relatively high tend to burst spontaneously when they reach the surface of the liquid without forming persistent froth.

In particularly stubborn cases involving solids that are entrained and carried up to the vicinity of the surface before reacting completely and form centers of reactions producing bubbles that do not spontaneously burst and tend to produce a cover of persisting foam, even this parasitic production of foam is never extensive and involves no more than a small fraction of the raw materials compared to conditions existing in the prior art.

If it appears, nevertheless, that the quantity of foam thus produced tends to increase in an undesirable manner, the novel process includes a variant which constitutes an object of the invention. According to this variant, the foam is diverted from the vat to the chamber receiving the raw materials and is injected with them once more into the bottom of the vat, being thus subjected once again to liquid pressure and, if they persist after this change in shape, to further expansion as they ascend through the liquid until at last they reach a maximum expansion at the surface. It is reasonable to think that by thus circulating the portion of the liquid which still contains gas bubbles, and subjecting it again to a succession of compressions and expansions, causes the joining of gas bubbles among themselves during periods of compression and their explosion on expansion. In carrying out the invention, a weir is used to bring about this circulation and it is possible in theory that the fall of the liquid over the weir destroys bubbles by extension, collapse, and unification of the walls.

However, whatever may be the theories which may be devised to explain the phenomenon it has been established that the process produces a destruction of foam such as had never before been attained so far as I am aware.

The process of the invention can be accomplished in a variety of ways and by different apparatus depending on the relative position which is given to the raw materials chamber and the reaction vat. Various means may also be employed to circulate raw materials and to impell them from the chamber to the vat. Furthermore, various means may be employed to adjust the level of the liquid in the vat with relation to the weir over which bubbles and bubbly liquid escapes to the raw materials chamber.

In practice, there is always a sufficient volume of liquid raw materials in the raw materials chamber, but this quantity is kept small in order to prevent any substantial reaction from taking place in that chamber. Consequently, it suffices to have that chamber of dimensions which are relatively small compared to the size of the vat.

The apparatus used to pass the raw materials from the chamber to the vat is preferably of high capacity so as to assure the passage with sufficient rapidity, of raw materials and returned froth, to utilize the full capacity of the vat. The apparatus, to accomplish this, may be an agitator pump, such for instance as one employing paddle wheels, or a helix of the Archimedes screw type, high speeds of rotation being employed.

The reaction vessel should be the greatest depth possible, one preferably so deep that the reaction is completed before the reagents reach the level of the discharge, and having a transverse section of relatively large size compared to the feeding chamber so that the rate of ascent of the materials in the vat will be slow enough to permit completion of the reaction. The reaction may be, furthermore, the more rapid as the raw materials are more perfectly mixed at the moment of their introduction to the vat, as is the case with the means above and hereinafter described.

The depth of the liquid in the vat should be deep enough to assure a substantial change in liquid head between the depths and the surface in order to impose a sufficient head upon the materials as they are introduced into the vat. One does not escape from the scope of the invention by introducing one or more of the raw materials into the feeding chamber and the other into the bottom of the vat in a position where the stream from the feeding chamber causes immediate mingling of the materials. Under such circumstances it is impossible for the reaction to take place in the feeding chamber.

This invention is applicable to all sorts of reactions regardless of their rate of progress. The invention involves the injection of foam producing reagents into the bottom of a vat under conditions of considerable liquid head so that the bubbles produced undergo a material stretching and expansion as they ascend and tend to burst as soon as they reach the free surface. The surface, in most cases, is at atmospheric pressure, but a slight, or more extensive, evacuation of the surface can be employed to still further work upon the walls of the bubbles. In cases which are not completely handled by such means, the froth may be recycled.

The apparatus conceived to carry out this process involves means for varying the level of the liquid so as to return the froth to the feeding chamber if necessary. This can be accomplished by an adjustable discharge weir or by an adjustable weir at the lip of the feed chamber, the fixed weir being properly located in the general level of the movable weir.

In the drawing, Figure 1 is a diagrammatic vertical section through one form of the apparatus.

Figure 1:
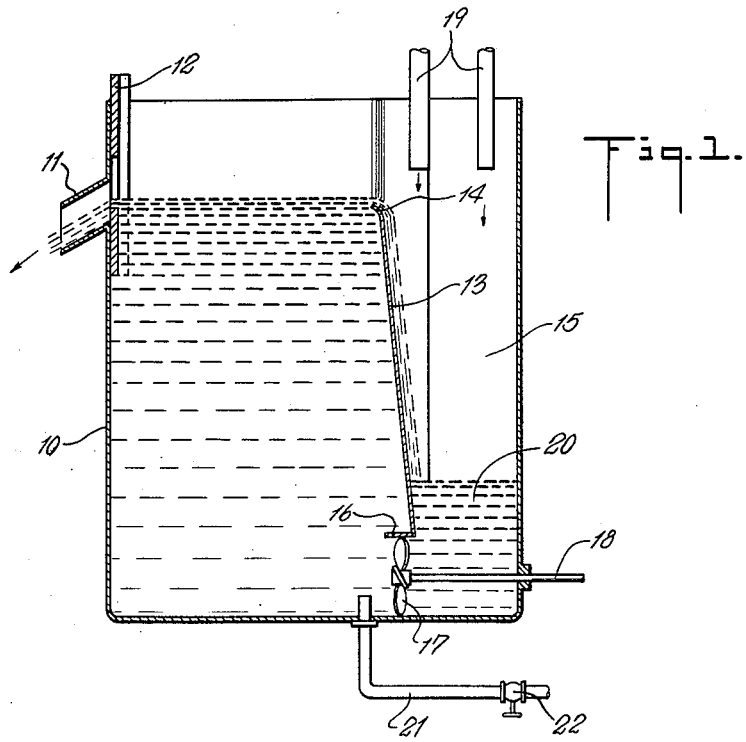
Figure 2:
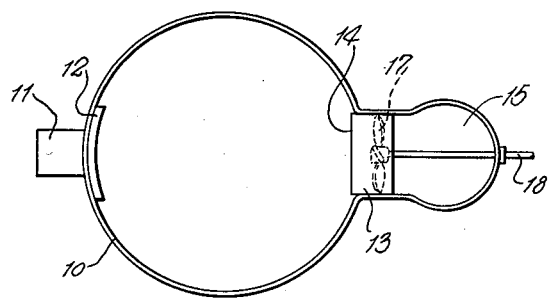
Figure 2 is a plan view of the same form of apparatus.

In Figure 1, the numeral 10 indicates a reaction vat of material depth having an overflow spout 11 before which a movable weir 12 is placed. This weir can be moved vertically and when it is so moved, changes the liquid level of the vat 10. At one side of the vat 10 is a weir 13 having a lip 14 which is on the general level of the outlet 11. By adjusting the movable weir 12, the level of liquid in vat 10 can be changed so as to cause an overflow into the feed compartment 15, beyond the weir 13, eliminating the discharge to that chamber and restrict it to the opening 11. At the bottom of the chamber 15 is an opening 16 in the weir communicating with the bottom of vat 10. The opening is circular and is occupied by an impeller 17 driven by a shaft 18 at high speed. This may be a paddle wheel impeller or an Archimedes screw driven at high velocity. Other sorts may be employed which generate sufficient speed. Above the chamber 15 are spouts 19 for admitting raw materials 20 to the chamber. Their rate of discharge is regulated so that the liquid covers the impeller and so that substantial reaction does not take place before the injection into the vat. A tube 21, having a valve 22, can be used to inject raw materials into the vat in front of the impeller 17 so that the raw materials will be mingled with the reactants injected by the impeller.

Figure 3:
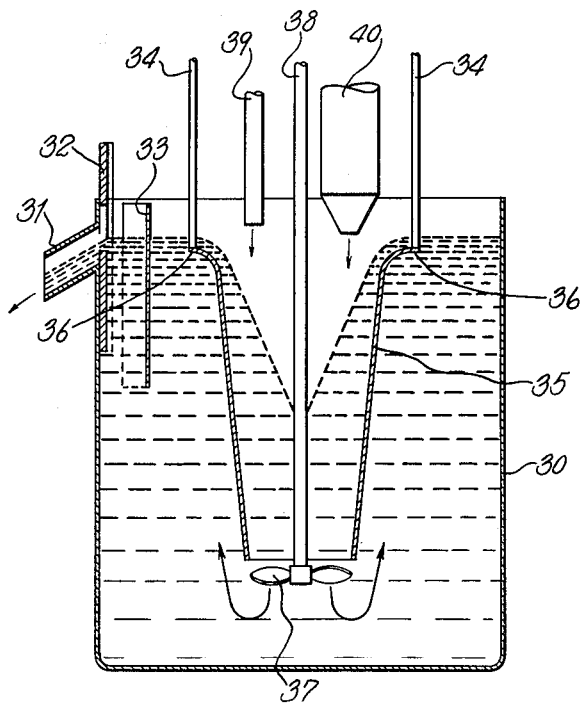
Figure 3 is a diagrammatic vertical section through a second form of apparatus.
Figure 4:
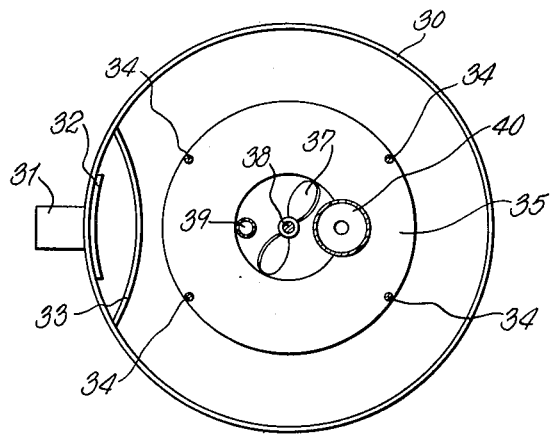
Figure 4 is a plan view of Figure 3.

In Figures 3 and 4 the vat 30 has an overflow 31 and an adjustable weir 32 similar to that shown in Figure 1. A baffle 33 encircles the weir and prevents the foam on the same surface of the vat from passing over the weir. Hangers 34 suspend a tubular chamber 35, which is of conical shape as shown, centrally of the vat. The upper lip 36 of this tubular chamber is on the general level of outlet 31 and serves as a weir permitting the fall of bubbly liquid into the chamber when the adjustable weir 32 is at an appropriate level. An impeller 37 on the end of a shaft 38, coaxial with the tube 35, injects the liquid in that tube into and toward the bottom of the vat 30. The raw materials themselves are admitted through spouts 39 and 40. The apparatus is capable of functioning with circulation of the surface liquid or without, according to the height of the adjustable weir. In order to bring about the recycling of a part of the liquid in the vat through the chamber, it suffices to raise the weir to the level or slightly above the level of the lip of the weir 13 of Fig. 1 or lip 36 of the tubular chamber of Fig. 3. This may be accompanied by increasing the speed of rotation of the pump so as to raise the level of the liquid in the vat. By changing the position of the movable weir and the speed of the pump, it is possible to vary the quantity of liquid which is discharged or is returned to the feed chamber.

In the form of the invention of Figure 3, the upper part of the liquid in the feed chamber, centrifugally rotated by the impeller, produces a whirlpool with an inverted apex and in proved practice the speed of rotation and the portion of the movable weir are so regulated that the apex of the whirlpool will be as elongated as possible in order to obtain the maximum explosion of bubbles. However, in order to prevent the introduction of air bubbles, the apex of the whirlpool should not usually be brought below the midheight of the tube.

The following examples illustrate the invention as applied to the reaction of acids on phosphates.

*Example 1.*—An attack on the phosphate by nitric acid in the presence of sulfuric acid and phosphoric acid. The operation was carried out in a vat such as represented in Figures 3 and 4 having a capacity of 1.5 cu. m. having a helix of Archimedes screw type with a double screw with a diameter of 250 mm. and a pitch of 120 mm. submerged at about 90 cm. beneath the free surface of the liquid turning at about 1400 R. P. M. The height of the adjustable weir was set at about 1 cm. above the lip of the tube 12 so that there was a circulation of liquid from the surface of the vat to the feed chamber and back into the lower section of the vat. The foam formed a pellicle about a centermeter thick on the surface of the liquid and were not drawn out of the vat through the discharge since the products of reaction were drawn from beneath the surface because of the guard baffle. In this vat there was treated, in a continuous way, one metric ton of Moroccan phosphate and 2.4 tons of a mixture of sulfuric, phosphoric and nitric acid per hour. The acid mixture contained 41% $HNO^3$, 8.75% $H_2SO_4$ and 4.45% $P_2O_5$. In an ordinary vat of the same capacity the reaction of the same quantity of raw materials required eight (8) hours if the harmful release of foam was to be prevented.

*Example 2.*—Manufacture of phosphoric acid. This was prepared by attacking phosphates with sulfuric acid in the presence of weak phosphoric acid derived from the washing of calcium sulphate produced by the reaction. This process permitted the continuous treatment of more than two (2) tons per hour of Moroccan phosphate in a vat of 2.5 cu. m. without being bothered by foam. In operating with the same quantities in an ordinary vat with simple agitation and in which the products were introduced from above, it is necessary to provide a dead volume of 7 cu. m. to accommodate the foam. In addition, the foam did not disappear until at least an hour after the end of the introduction of the phosphate, which prevented continuity of process.

The invention makes possible the continuous operations of processes which are normally accompanied by the release of large amounts of foam, prevents the formation of material quantities of foam on top of the vat, and speedily disintegrates and destroys such minor quantities of foam as are produced.

As many apparently widely different embodiments of the present invention may be made without departing from the spirit and scope thereon, it is to be understood that the invention is not limited to the specific embodiments.

What is claimed is:

1. Apparatus for reaction of foam producing reactants liquid including a vat with an adjustable weir discharge, a tubular compartment having its upper end at a level within the range of movement of said weir, extending downward to a predetermined level and opening into the vat at both ends, means to pour foam producing reactants into said compartment, and impeller means at the bottom of the compartment directed to drive the contents of the tubular compartment into the vat, the depth of said vat beneath the weir being sufficient to permit the reaction to approach completion beneath the surface of the liquid in the vat and to establish a substantial head.

2. A method of reacting reactants, which react with the liberal production of foam at the surface of the products of reaction, comprising an acid and a phosphatic material, with a reduced release of foam at the surface of the products of reaction, that comprises establishing a pool containing the products of reaction, establishing another mass comprised of at least one said reactant, said pool and mass being interconnected in the lower levels of the pool of said products, and forcing the said mass into the pool of products through said interconnection under relatively high hydrostatic head which is furnished by the reaction mass in the vat at such velocity that flow through the interconnection is from the mass into the pool, and simultaneously injecting another reactant into said pool in reactive proximity to said forced mass, so that the reaction takes place in the pool and mainly in the lower levels thereof.

3. The method of claim 2 in which the interconnection between the pool and mass is at about 90 cm. beneath the upper surface of the pool, and in which about one metric ton per hour of Moroccan phosphate and about 2.4 tons of mixed sulfuric, phosphoric and nitric acids are mixed per hour in the reactant mass and forced through said connection into said product pool with such speed that the reaction takes place in the pool.

4. The method of claim 3 in which the upper surface of the products pool, to the depth of about 1 cm., flows into the mass.

5. The method of claim 2 in which 2 metric tons per hour of Moroccan phosphate are reacted with sulfuric acid and weak phosphoric acid.

6. Apparatus adapted to the carrying out of foam-producing fluid reactions, such as the reaction of acid and phosphate, which comprises a vat having an overflow discharge orifice, an adjustable weir mounted at said overflow adapted to vary the level of the fluid in said vat, a tube separating a portion of the vat intermediate the top and bottom into inner and outer vertical, concentric chambers, the top of said inner chamber being on a level within the limits of movement of the movable weir, the bottom of said inner chamber opening into the lower portion of the vat, downwardly directed impeller means located near the outlet from the inner chamber to the bottom of the vat, and reactant supply means arranged to feed reactants into the inner chamber above said impeller.

7. Apparatus for the carrying out of foam-producing fluid reactions, such as the reaction of acid and phosphate, which comprises a vat having an overflow discharge orifice comprising a movable weir, an upright partition dividing the vat into two chambers extending from a place above but near the bottom to a level within the limits of movement of the weir, said chambers being interconnected beneath said partition, impeller means directed from one partition to the other beneath the level of the weir, and reactant supply means directed into the reactants chamber upstream of the impeller, the impeller being of capacity sufficient to impel the reactants into the products chamber as they are received in the reactants chamber.

8. A reaction vat having an overflow orifice, a partition, dividing the vat into horizontally arranged, interconnected chambers, said partition having its upper level slightly lower than the discharge level of the said orifice, to provide for a flow of surface material from one side of the partition to the other side, reactant supply means discharging into said other chamber, the said interconnection between chambers being at the bottom of said partition, and impeller means beneath said partition operative substantially throughout the area of the interconnection between said chambers to force material from the said other to said one side of said partition.

9. The method of carrying out a foam producing reaction that includes the steps of impelling raw material into a part of a pool containing liquid products of reaction under material head, the reactants being impelled into the lower part of the pool with such speed that it is practically impossible for them to react before having penetrated into the pool, the reaction taking place in the lower levels of the pool under relatively high hydrostatic head which is furnished by the reaction mass in the pool, the depth of the liquid being such that the reaction is substantially completed under the surface, foam produced in the reaction being skimmed from the surface and again impelled into the liquid as aforesaid, a mixture of foam and new raw material being maintained as a whirlpool having an apex separated from the impeller by unbroken liquid.

References Cited in the file of this patent

UNITED STATES PATENTS

| Number | Name | Date |
|---|---|---|
| 181,668 | Gregg et al. | Aug. 29, 1876 |
| 639,642 | Witteman | Dec. 19, 1899 |
| 1,198,519 | Bradley | Sept. 19, 1916 |
| 1,242,445 | Ittner | Oct. 9, 1917 |
| 1,376,073 | Borcherdt | Apr. 26, 1921 |
| 1,449,114 | Hayduck | Mar. 20, 1923 |
| 1,748,739 | Sundstrom | Feb. 25, 1930 |
| 1,792,963 | Boye | Feb. 17, 1931 |
| 1,859,827 | Jacobsen | May 24, 1932 |
| 1,922,224 | Tijmstra | Aug. 15, 1933 |
| 1,981,634 | Richardson et al. | Nov. 20, 1934 |
| 2,058,503 | Rafton et al. | Oct. 27, 1936 |
| 2,105,690 | Greenblatt | Jan. 18, 1938 |
| 2,109,347 | Beekhuis | Feb. 22, 1938 |
| 2,206,507 | Kuhni | July 2, 1940 |
| 2,213,211 | Fleckenstein | Sept. 3, 1940 |
| 2,231,544 | McCorquodale | Feb. 11, 1941 |
| 2,280,674 | Thomas | Apr. 21, 1942 |
| 2,416,924 | Jones | Mar. 4, 1947 |

OTHER REFERENCES

"Inorganic Chemistry," 1947, by W. Norton Jones, page 350, The Blakiston Co., Philadelphia.